(12) United States Patent
Paxton et al.

(10) Patent No.: US 7,971,557 B2
(45) Date of Patent: Jul. 5, 2011

(54) DOG BOOT

(76) Inventors: Stephen E. Paxton, Brainerd, MN (US); Lisa M. Lugo-Paxton, Brainerd, MN (US)

(*) Notice: Subject to any disclaimer, the term of this patent is extended or adjusted under 35 U.S.C. 154(b) by 875 days.

(21) Appl. No.: 10/980,085

(22) Filed: Nov. 2, 2004

(65) Prior Publication Data
US 2005/0092260 A1    May 5, 2005

Related U.S. Application Data

(60) Provisional application No. 60/517,112, filed on Nov. 3, 2003.

(51) Int. Cl.
*A01K 13/00* (2006.01)

(52) U.S. Cl. ........................................ 119/850

(58) Field of Classification Search .......... 119/850, 119/851; 54/82, 79.2, 79.3, 79.4, 79.1; D30/146, D30/144, 145; 36/111, 7.4, 7.3, 7.1 R, 89, 36/90, 71
See application file for complete search history.

(56) References Cited

U.S. PATENT DOCUMENTS

| | | | | |
|---|---|---|---|---|
| 630,310 A * | 8/1899 | Agnew | ................ | 168/2 |
| 866,423 A * | 9/1907 | Bellatty | ................ | 36/62 |
| 2,064,566 A | 12/1936 | Richman | | |
| 2,424,172 A | 7/1947 | Huddleston | | |
| 2,535,394 A * | 12/1950 | Davis | ................ | 36/111 |
| 2,651,853 A | 9/1953 | Lewis | | |
| 3,286,375 A * | 11/1966 | Troy | ................ | 36/7.1 R |
| 3,762,073 A | 10/1973 | Cantales | | |
| D229,197 S * | 11/1973 | Jackson | ................ | D30/146 |
| 4,457,261 A | 7/1984 | Marshall | | |
| 4,458,431 A * | 7/1984 | Sinclair | ................ | 36/88 |
| 4,543,911 A | 10/1985 | Marshall | | |
| 5,148,657 A | 9/1992 | Stafford et al. | | |
| 5,209,048 A * | 5/1993 | Hanson | ................ | 54/82 |
| 5,211,672 A * | 5/1993 | Andujar | ................ | 36/106 |
| 5,408,812 A * | 4/1995 | Stark | ................ | 54/82 |
| 5,452,685 A | 9/1995 | Thomas | | |
| 5,495,828 A * | 3/1996 | Solomon et al. | ................ | 119/850 |
| D379,251 S | 5/1997 | Mezey | | |
| D387,511 S | 12/1997 | Caditz | | |
| 5,715,661 A * | 2/1998 | Meyers | ................ | 54/82 |
| 5,937,542 A * | 8/1999 | Bourdeau | ................ | 36/10 |
| 6,186,097 B1 | 2/2001 | Brockmann et al. | | |
| 6,226,898 B1* | 5/2001 | Trimble et al. | ................ | 36/118.2 |
| 6,470,832 B1 | 10/2002 | Peacock | | |
| 6,526,920 B1* | 3/2003 | Griffin | ................ | 119/850 |
| 6,546,704 B1 | 4/2003 | Fisher | | |
| 6,851,394 B1 | 2/2005 | Young | | |
| 6,863,033 B1 | 3/2005 | Fleming | | |
| 7,185,612 B2 | 3/2007 | Faulk | | |

OTHER PUBLICATIONS

"Protrude", Webster's New Universal Unabridged Dictionary, 1983, p. 1449.
"Subtalar Joint", HTTP://en.wikipedia.org/wiki/Calcaneus, Jan. 9, 2009, 1 page.
Fig. 1 from "Comparison of Human versus Canine Ped", Dr. Ben J. Character, DVM, Nov. 2008.
"Paw", HTTP://en.wikipedia.org/wiki/Paw, Apr. 3, 2007, 2 pages.

* cited by examiner

*Primary Examiner* — Timothy D Collins
*Assistant Examiner* — Valentina Xavier
(74) *Attorney, Agent, or Firm* — Albert W. Watkins

(57) ABSTRACT

A dog boot is fabricated using a breathable substrate, preferably of durable material such as heavy nylon. Onto the substrate, various friction pads, wear pads, tensioning straps, and strategically located cushions are attached. Specially configured slits ensure that a wide range of leg sizes relative to paw sizes may be accommodated, while easing application of the boot and eliminating any risk of bunching.

15 Claims, 5 Drawing Sheets

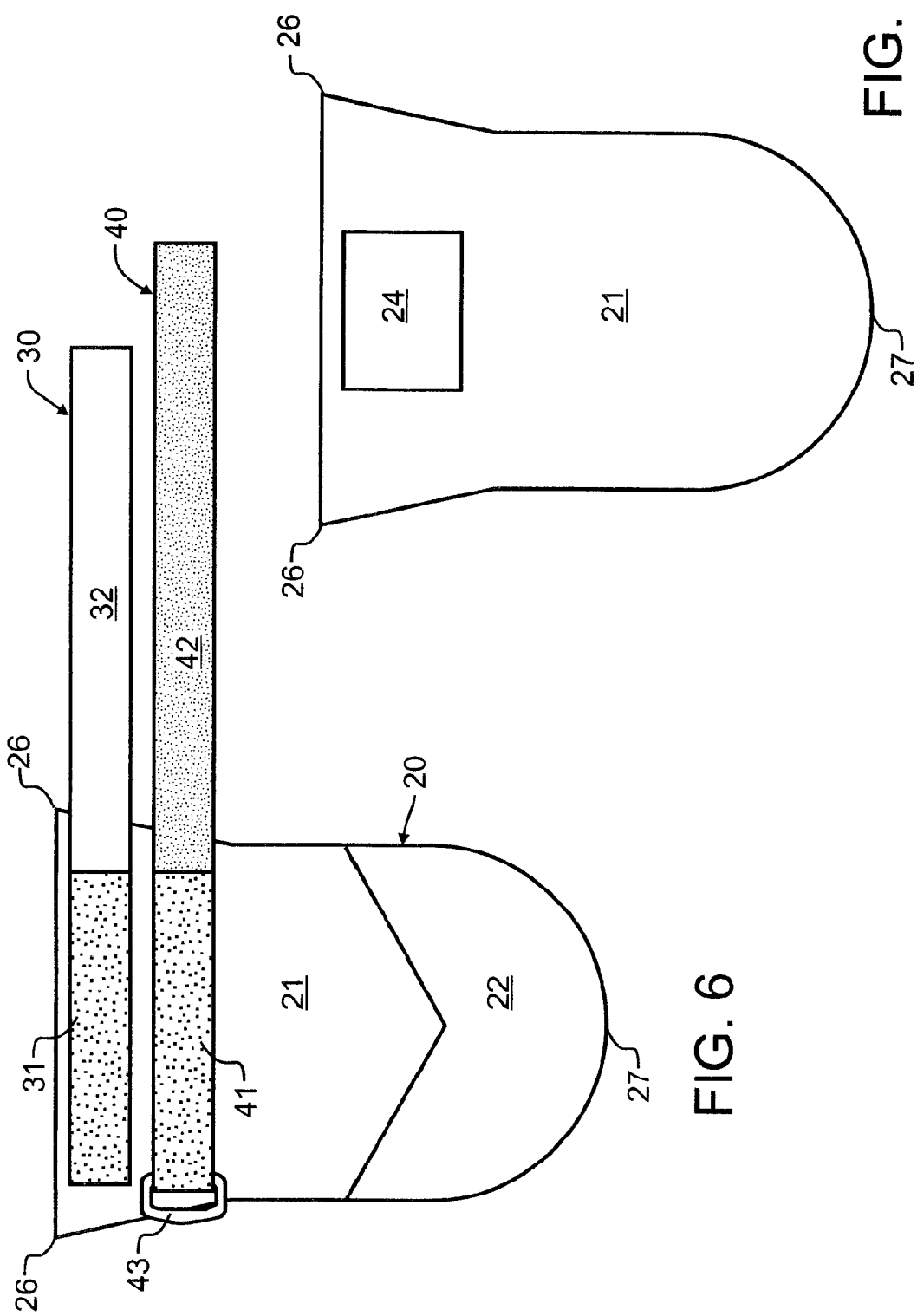

DOG BOOT

CROSS REFERENCE TO RELATED APPLICATIONS

This application claims priority to United States provisional application Ser. No. 60/517,112 filed Nov. 3, 2003, the contents which are incorporated herein by reference in entirety.

BACKGROUND OF THE INVENTION

1. Field of the Invention

This invention pertains generally to the field of animal husbandry, and more particularly to protective dog boots.

2. Description of the Related Art

Dogs have long been known as "man's best friend". These animals serve very diverse functions, providing companionship, guarding, towing, hunting, and even sensory conversion, such as a seeing eye-dog, a hearing-assist dog, and even a police or military dog. Regardless of the relationship between person and dog, at various times, and for many diverse reasons, it may be highly desirable for the dog owner to place boots upon the dog's paws. For example, in inclement weather, a person may not wish to try to clean a dog's paws after the dog has been outside. Boots that may be placed and then readily removed may be much easier to use than what might be required to thoroughly clean the dog's feet. In other instances, a dog may have injured one or more paws, and so may not have the usual toughness. In such case, a suitable boot may help to protect the affected paw until sufficient healing has occurred to no longer require the boot. In other cases, the dog's pads may be inadequate for traversing the ground when temperatures are particularly severe, such as in colder climates or with dogs that are not adapted to the cold, or conversely in extremely hot climates where the ground surface may be scorching. Racing and sled dogs may be exposed to a particularly harsh course or environment, and so may also need special protection. Boots can be used to prevent snow from getting up between the pads of the foot, freezing, abrading the soft tissue, and thereby producing a lame dog.

A number of artisans have recognized one or more of the foregoing needs, and so have designed various dog boots. One such patent which exemplifies these known boots is U.S. Pat. No. 6,526,920 by Griffin, entitled "Dog boot for hunting and other outdoor activities," the teachings which are incorporated herein by reference. This patent describes dog boots having a zipper and dual hook-and-loop leg fasteners with loops for tightening, and a non-skid sole. Additional patents that offer useful teachings and insights are incorporated by reference, including U.S. Pat. No. Des. 387,511 by Caditz; U.S. Pat. No. 5,495,828 by Solomon et al; U.S. Pat. No. 5,408,812 by Stark; U.S. Pat. No. 6,186,097 by Brockmann et al; U.S. Pat. No. Des. 379,251 by Mezey; U.S. Pat. No. 5,148,657 by Stafford et al; U.S. Pat. No. 5,452,685 by Thomas; U.S. Pat. No. 2,064,566 by Richman; U.S. Pat. No. 2,424,172 by Huddleston; U.S. Pat. No. 2,651,853 by Lewis; U.S. Pat. No. 3,762,073 by Cantales; U.S. Pat. No. 4,457,261 and U.S. Pat. No. 4,543,911 by Marshall; and U.S. Pat. No. 6,470,832 by Peacock.

However, these prior art boots tend to suffer from several common limitations. As may be recognized, prior art dog boots are often very difficult to put on the dog's foot. This problem will be intensified by the fact that most dogs will not remain still while a person is trying to put the boot on. Once on, these prior art boots do not stay on well. Many will simply spin about, potentially causing much discomfort or harm to the dog. Others will slide off as the dog walks or runs, much like loose socks coming off of a person walking on carpet. This phenomenon is quite significant, since the boot must be designed to be of non-slip material, or the dog will sprawl on finished wood, icy or other relatively slippery surfaces. Yet, the boot must also preferentially stay on the dog's paw, rather than slide with respect thereto, even when the booted dog is traversing terrain having good traction. Simply applying more force about the dog's leg to keep the boot on has proven to be totally unsatisfactory, since circulation within the leg may become limited or disrupted. Unintended bunching of the boot top can be harder to detect, and can also restrict circulation. Yet, different dogs will have significantly different proportions between pad size and leg diameter, meaning that the boot must be very adjustable to accommodate different dog breeds and sizes. Finally, complex boots are not only more difficult to put on the dog, but they are also much more expensive to produce, which is also undesirable.

SUMMARY OF THE INVENTION

In a first manifestation, the invention is a dog boot, suitable for insertion and removal of a dog paw and providing an operatively protective covering about the dog paw. The dog boot is fabricated from a generally tubular body member having a closed end and an open end. A means is provided adjacent the open end for allowing the open end to expand, which facilitates insertion of a dog paw. A means is also provided adjacent the expanding means for contracting the open end. At least one cushion is located on an interior of the open end, and extends less than a circumference of the open end when the open end is operatively contracted.

In a second manifestation, the invention is a protective dog boot. The protective dog boot is fabricated from a first flaccid sheet having a generally rectangular border, with rounded corners adjacent a first end; and a second flaccid sheet having a generally rectangular border, with rounded corners adjacent a first end. A means couples a majority of the first flaccid sheet generally rectangular border and a majority of the second flaccid sheet generally rectangular border to form an opening therebetween suitable for encompassing a dog paw, with first flaccid sheet rounded corners adjacent second flaccid sheet rounded corners.

In a third manifestation, the invention is a secure dog boot. A first laminate has a breathable substrate, a toe cap, tensioning means on a first surface of the breathable substrate, and a cushion on a second surface of the breathable substrate opposed to the first surface and separated from the tensioning means at least by a thickness of the breathable fabric. A second laminate has a breathable substrate, a waterproof friction pad, tensioning means on a first surface of the breathable substrate, and a cushion on a second surface of the breathable substrate opposed to the first surface and separated from the tensioning means at least by a thickness of the breathable fabric. The first and second laminates are coupled to form a tube having an open end and a closed end. The first laminate cushion and second laminate cushions are opposed to each other, adjacent the tube open end, and are located within a circumference defined by the tensioning means. The cushions only partially circumscribe the circumference, so that the first laminate cushion does not overlap with the second laminate and the second laminate cushion does not overlap with the first laminate when the tensioning means is operatively tensioned about a dog leg.

OBJECTS OF THE INVENTION

Exemplary embodiments of the present invention solve inadequacies of the prior art by providing a breathable fabric substrate, preferably of durable material such as heavy nylon, onto which friction pads, wear pads, tensioning straps, and strategically located cushions are attached. Specially configured slits ensure that a wide range of leg sizes relative to paw sizes may be accommodated, while easing application of the boot and eliminating any risk of bunching during such application.

A first object of the invention is to provide a dog boot which is readily placed about a dog's paw. A second object of the invention is securement of the boot against slippage, spin or separation with respect to the dog's leg, while simultaneously substantially reducing the risk of circulatory disruption or harm to the dog. Another object of the present invention is to ensure that the boot will readily accommodate a wide range of proportions of paw size to leg diameter. A further object of the invention is to provide a boot which is substantially non-slip with respect to a surface the dog is traversing. Yet another object of the invention is to provide a more readily produced boot which is not unnecessarily complex or expensive to produce, and yet which is durable. An even further object of the invention is that the boot float for water usage. Another object of the invention is that the boot not unduly abrade the dog during use.

BRIEF DESCRIPTION OF THE DRAWINGS

The foregoing and other objects, advantages, and novel features of the present invention can be understood and appreciated by reference to the following detailed description of the invention, taken in conjunction with the accompanying drawings, in which:

FIG. 6 illustrates the preferred embodiment dog boot of FIG. 1 from a top view with the boot laid flat, and the straps fully released.

FIG. 7 illustrates the preferred embodiment dog boot of FIG. 6 looking at the top of the boot, with the bottom removed as though inside the boot, from a bottom view.

DESCRIPTION OF THE PREFERRED EMBODIMENT

Figure 1:
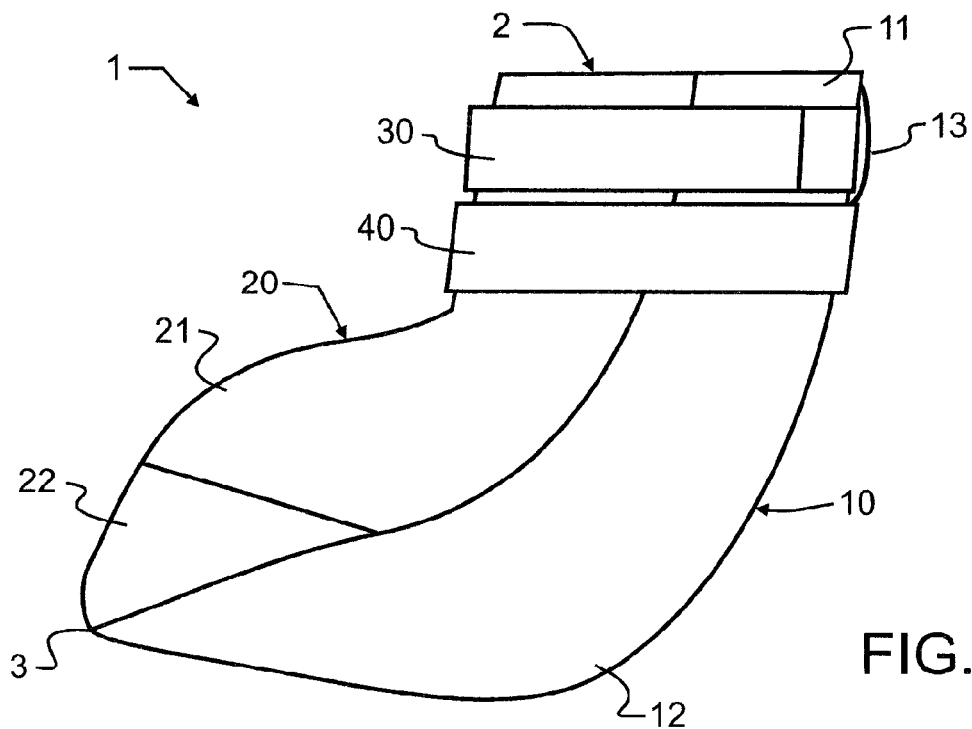
FIG. 1 illustrates a preferred embodiment dog boot designed in accord with the teachings of the present invention from a side plan view, in an operative or worn position, without illustrating the dog's leg.

Manifested in the preferred embodiment boot 1, the present invention fulfills the objectives set forth herein above and others. As shown in FIG. 1, boot 1 has the appearance of a flexible or somewhat flaccid tube, with a closed end 3 adjacent toe protective patch 22 and an open end 2 distal therefrom. Boot 1 includes a bottom 10 having a non-slip ground-engaging surface 12. In the preferred embodiment boot 1, the rear or bottom of the boot is covered from closed end 3 up to straps 30, 40 with this material, though it will be understood that surface 12 maybe of any size, and so may comprise a small pad on bottom 10, or may be omitted completely. This non-slip ground-engaging surface 12 will most preferably be a material sold under the brand name "Toughtek," available from Harrison Technologies, Inc. of Gloversville, N.Y., USA, which is a durable material having good traction and pliability even at very low temperatures, and which is non-slip. Ground-engaging surface 12 could be Cordura, other nylon or any material that would have a specific feature such as traction, durability, or waterproofing that the designer elects to incorporate in a boot. However, the non-slip characteristic is most preferable, so as to enable a dog to comfortably stand on relatively slippery surfaces such as finished wood, ice or the like.

A second layer of material 11 may either extend from or be parallel to and continue beyond surface 12, or, when surface 12 is completely omitted, instead of surface 12. Material 11 will most preferably be relatively soft, compliant, durable, strong, and resistant to the elements. Standard nylon, ballistic nylon, or Cordura is most preferred for this substrate, owing to the inherent durability, ready fabrication, and permeability to gasses, while still providing some water resistance. In the preferred embodiment, material 11 extends from toe 17 to flare terminations 16, and is laminated with surface 12 by simple edge stitching.

A similar material will also be used in the fabrication of boot top 20, as material 21. With somewhat larger exposed surface area, the breathable nature of a woven or non-woven fabric will be very beneficial in many applications. A protective patch 22 will preferably be laminated with material 21. As shown in the preferred embodiment boot 1, protective patch 22 serves as a toe patch, which is particularly beneficial when a dog, for whatever reason, has a tendency to drag the toe. Protective patch 22 will help prevent serious damage to boot 1 as well as to the dog's foot. This patch in the preferred embodiment is preferably a stronger, more abrasion resistant material, and so may be Cordura or ballistic nylon, or other relatively more abrasion resistant material. Waterproofing may also be applied, if desired.

Strap 30, which is relatively close to the open end 2 of boot 1, would potentially slip above open end 2, and so become less effective. To prevent such slippage from occurring, a small closed loop 13 is provided at the top back of boot 1, adjacent open end 2. While in the preferred embodiment, only strap 30 passes through loop 13, it will be recognized by those skilled in the art that both straps 30 and 40 could pass through. Nevertheless, in the preferred embodiment boot 1, the operation of strap 40 is not as well suited to passing through loop 13, and so, in the preferred embodiment and subject to review for each new design incorporating the present invention, it does not do so.

Figure 2:
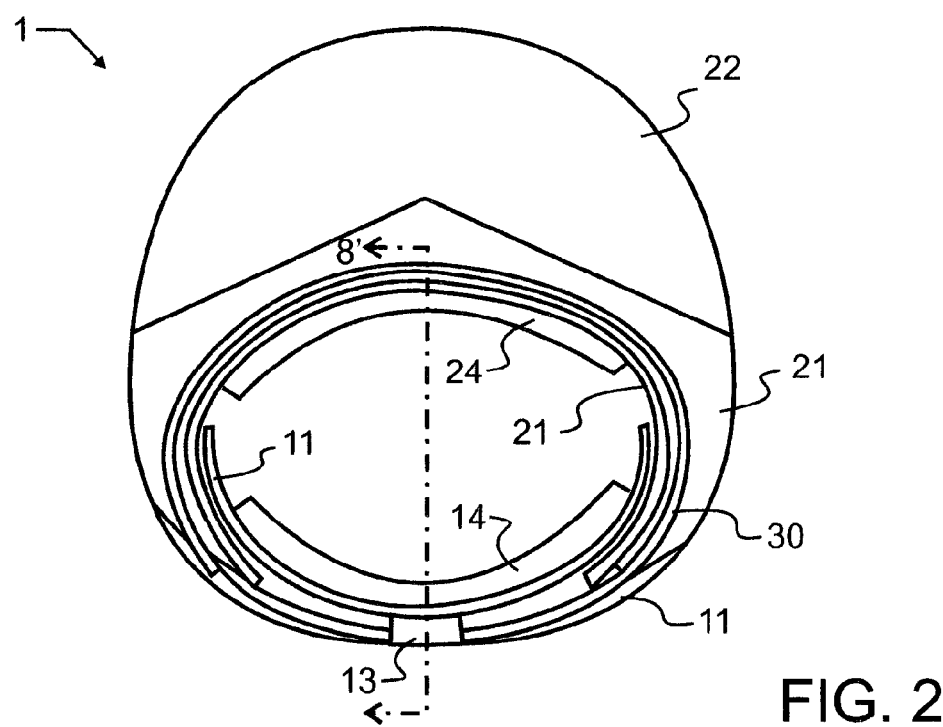
FIG. 2 illustrates the preferred embodiment dog boot of FIG. 1 from a top view looking down into the boot.
Figure 3:
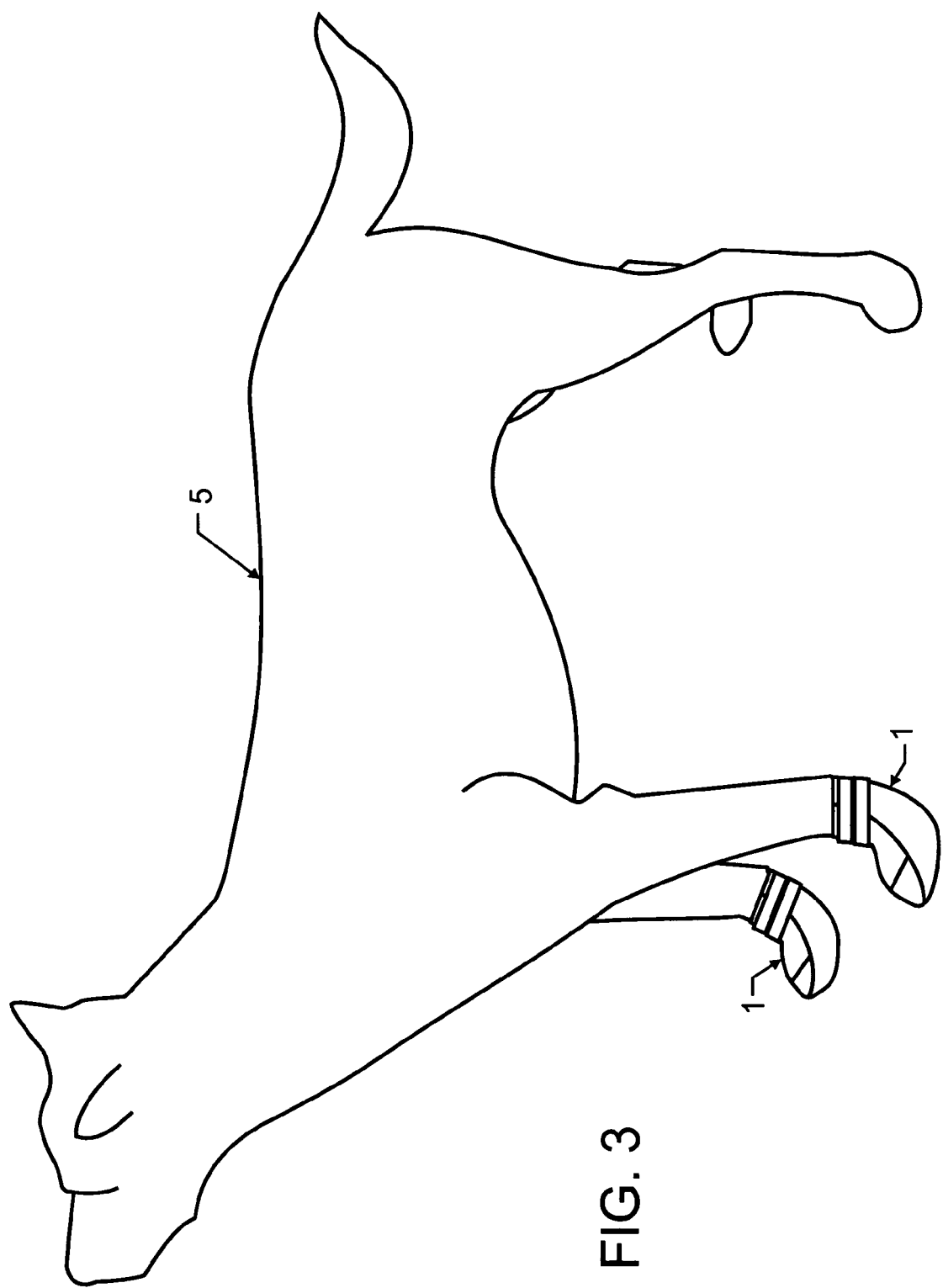
FIG. 3 illustrates the preferred embodiment dog boot of FIG. 1 from a side view, as placed upon the front paws of a dog.

FIG. 2 illustrates preferred embodiment boot 1 from a top view, showing the relationship of the various boot components. As illustrated, top and front layer 21 may readily encompass bottom and back layer 11 adjacent the open end 2 of boot 1. Cushioning pads 14, 24 will most preferably extend on an inside of the respective layers 11, 21, within a circumference of contraction created by straps 30, 40 when these straps are tightened about the leg of a dog. In practice, these pads 14, 24 prevent undesirable constriction of a dog's leg, while at the same time forming a relatively high friction contact with the dog's leg, to help to ensure that boot 1 does not slip off. Noteworthy here is the fact that Cordura and ordinary nylons are generally relatively slippery, though these same materials are very durable and desirable for their intrinsic durability. Consequently, to use a durable and flexible nylon without the present synergy of the higher friction pads will result in the boots sliding from the dog's legs. These pads 14, 24 will also ensure a relatively complete surface contact with an otherwise non-cylindrical leg, which also helps to ensure even force distribution about the entire circumference of contraction formed by straps 30, 40.

Most preferably, boot 1 will be dimensioned to cooperate with the intrinsic geometry of a dog paw. In this regard, it is noted that most dog paws are slightly wider at the pad than they are in the leg region slightly above and immediately adjacent the pad. Consequently, with reasonable sizing and placement, cushion 14 will be placed on the leg adjacent the dog's pad, and strap 40 will secure cushion 14 in that position. Such placement ensures that the bulge at the dog's pad will produce interference with cushion 14, thereby preventing cushion 14 from sliding down into the dog's pad region.

Figure 8:
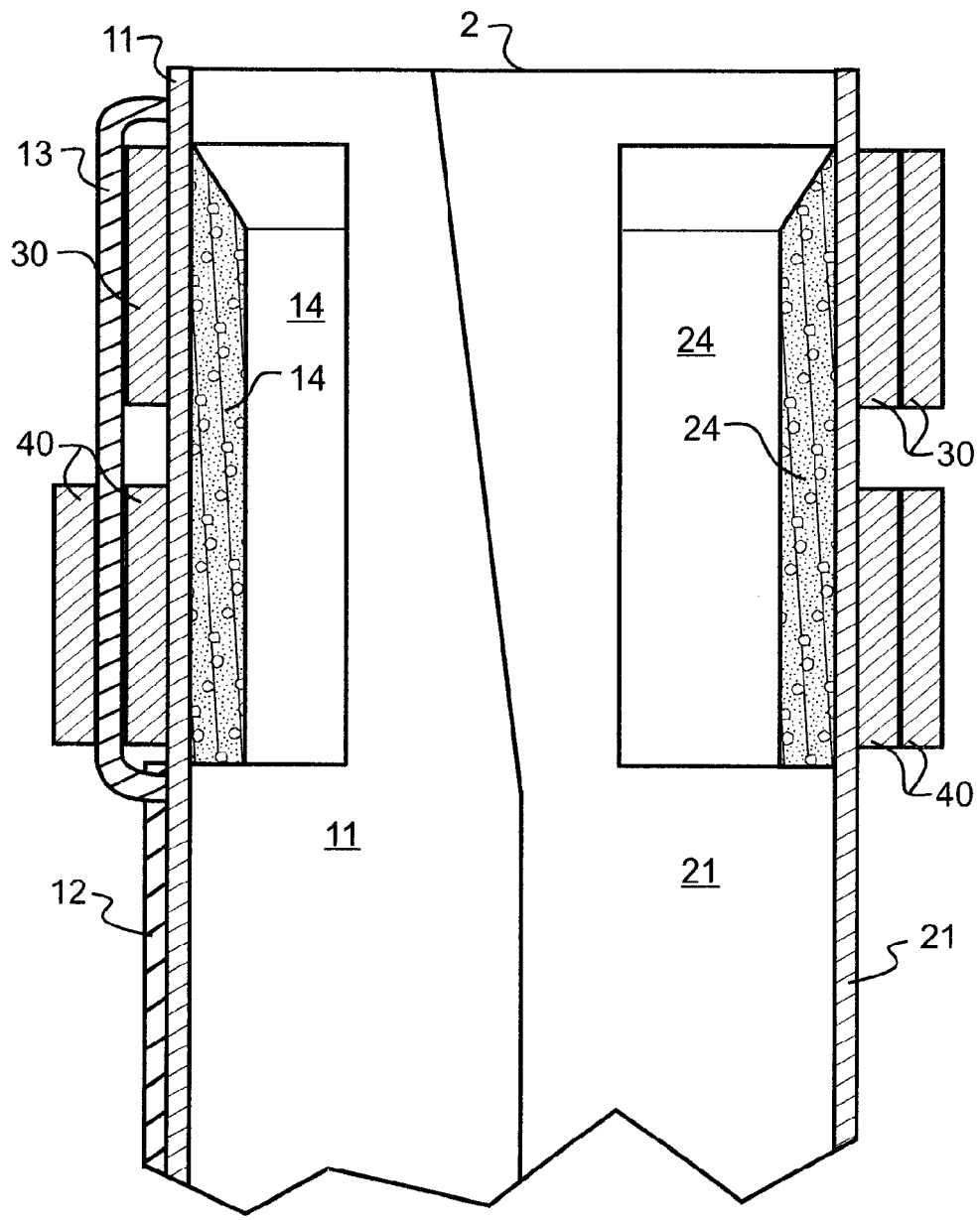
FIG. 8 illustrates the region of the preferred embodiment dog boot adjacent open end 2 by enlarged sectional view taken along line 8' shown in FIG. 2.

To further advance this effect, it is quite desirable to cut at least cushioning pad 14 and optionally cut cushioning pad 24 at different angles than perpendicular on edges adjacent open end 2, while keeping these edges perpendicular adjacent the dog's pad, as may be best viewed in the enlarged sectional view of FIG. 8. This permits the dog's paw to pass into boot 1 with less interference, while the sudden perpendicular edge at the base of cushioning pads 14, 24 creates interference.

In the most preferred embodiment, cushioning pads 14, 24 may comprise one or more of a variety of foams and foam rubbers, though closed cell polyurethane and neoprene are preferred, for their combination of low cost, ready availability, water resistance, and high coefficient of friction with many surfaces and materials. This latter coefficient of friction will help to ensure that boot 1 stays in place without requiring excessive forces be applied to straps 30,40. Additionally, depending upon the relative friction between the dog leg and boot 1, other devices may be used which serve to contract open end 2. Such devices are too numerous to specifically mention herein, but can include elastic materials, and even resilient and elastic fabrics commonly found in the apparel industry.

Figure 4:
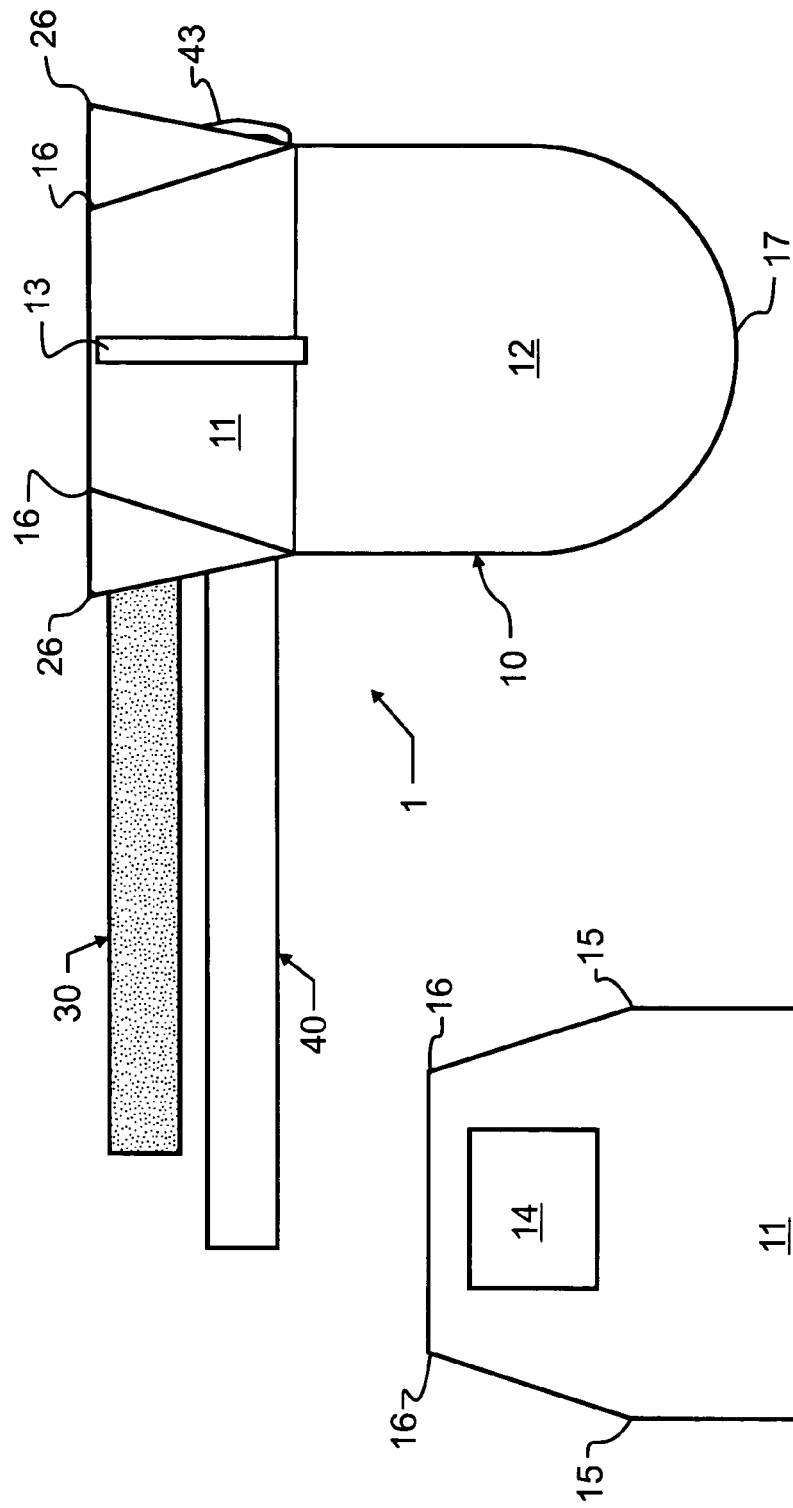
FIG. 4 illustrates the preferred embodiment dog boot of FIG. 1 from a bottom view with the boot laid flat, and the straps fully released.
Figure 5:
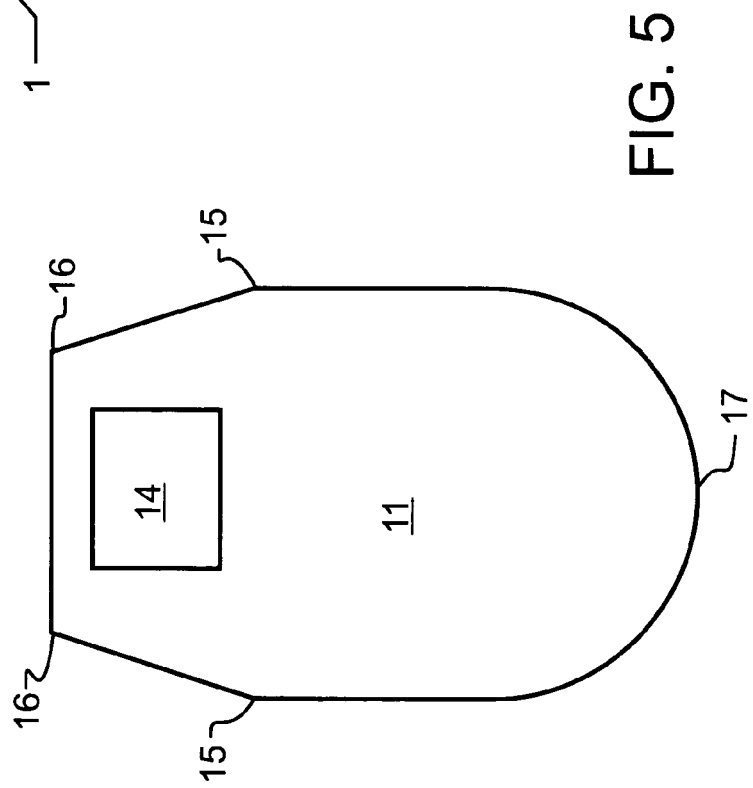
FIG. 5 illustrates the preferred embodiment dog boot of FIG. 4 looking at the bottom of the boot, with the top removed as though inside the boot, from a top view.

FIG. 4 illustrates boot 1 laid out flat, from a bottom view, as it will typically be after manufacture but before being placed on a dog's leg. Straps 30 and 40 are extending from boot 1, rather than being in the operative, wrapped position shown in FIGS. 1 and 2. FIG. 5 illustrates boot 1 showing only bottom 10, looking at the side of bottom 10 opposed to that shown in FIG. 4. FIG. 5 shows the relative size and placement of cushioning pad 14. FIG. 5 also illustrates the overall shape and geometry of bottom 10, which is that generally of a rectangle, but with two significant changes. First, adjacent closed end 3, the ninety degree corners that would be found in a standard rectangle have been chamfered, to yield a relatively rounded toe end 17. Those skilled in the art will recognize that the final amount of chamfer or other shaping will depend upon the paw print for which the boot 1 is intended. A good universal shape is the gradual arc formed by extensive chamfer as shown in the present figures.

Opposite to toe end 17 there is a flare which begins at points 15 and narrows with increasing distance from toe end 17 and closed end 3 to the end points 16. In contrast, the top and front 20 has an opposite flare which widens with increasing distance from toe end 17 and closed end 3 to the end points 26, and also includes the chamfer adjacent closed end 3 which forms rounded toe end 27. Cushion 24 will still most preferably be placed adjacent to straps 30, 40, but will, like pad 14, not extend the full width of the rectangular shape of top and front 20.

Boot 1 consists of both top and front 20 and bottom 10. In the preferred embodiment, these two components are assembled by stitching at a perimeter therebetween, though many other known manufacturing equivalents exist and are contemplated herein, including for exemplary purposes only and not limited thereto, thermal bonding, chemical bonding, and adhesive bonding. Rather than stitching the entire perimeter, which would fully close boot 1, stitching will stop at points 15, and not extend beyond towards points 16. This means that two opposed slits have been formed adjacent points 16, most preferably in the region over which straps 30, 40 travel. The slits thus formed provide overlap without bunching, and the fact that cushions 14, 24 do not form an entire circumference means that straps 30, 40 may be tightened about a wider range of dog legs without any fear of bunching than was possible in the prior art. Yet, and as aforementioned, cushions 14, 24 will ensure good contact with a dog's leg. The shapes illustrated in FIGS. 4-7 also allow boot 1 to easily slip onto a dog's foot, as the opening is quite wide at the top of the boot when the slits are opened.

By using closed cell foam for pads 14, 24, boot 1 has the ability to float in water, which is an advantage when a boot comes off the dog in water. Unfortunately, the effects of water, muck and the like may still exert forces that are greater than the boot can otherwise resist. Hook and loop fasteners or a similar product are used to make up the fastening system comprised by straps 30, 40. The top strap 30 is a simple hook and loop fastening system preferably placed near the top of boot 1. The bottom strap 40 uses a plastic loop 43 to increase leverage and holding power. Strap 40 goes around the back of boot 1, through loop 43, and reverses direction to come back to the front of boot 1. This allows a person to use leverage when tightening strap 40. This strap 40, along with cushions 14, 24 underneath straps 30, 40, ensures boot 1 will stay on the dog under the most severe conditions, including but not limited to mud, water, snow, heavy brush and the like. FIG. 6 illustrates the hook portions 31 and 41 of straps 30, 40, and the loop portions 32, 42 which are designed to inter-engage and fasten together, though it will be understood that these arrangements of hooks and loops are not critical to performance.

As may be understood, these preferred embodiment booties have many uses, including keeping a dog's feet clean when outside, to protect hunting dog's feet from thorns and burrs, and, when walking them, to protect dog's feet from chemicals and severe cold in the winter, and severe heat in the summer. Additionally, while the preferred embodiment describes application to dogs in accord with the requirement for enablement, those skilled in animal husbandry will recognize that the present invention will have application to other animals having similar paw and leg anatomy. Consequently, while the foregoing details what is felt to be the preferred embodiment of the invention, no material limitations to the scope of the claimed invention are intended. Further, features and design alternatives that would be obvious to one of ordinary skill in the art are considered to be incorporated herein. The scope of the invention is set forth and particularly described in the claims hereinbelow.

We claim:

1. A dog boot, suitable for insertion and removal of a dog's leg and paw and providing an operatively protective covering about said dog paw, comprising:

a generally tubular body member having a closed end and an open end and defining a dog paw region operative to surround said dog's paw and a dog leg region operative to surround said dog's leg;

a means for contracting said dog leg region;

at least one cushion on an interior of said dog leg region protruding interiorly from said generally tubular body member above and immediately adjacent to said dog paw region by an amount of protrusion when said contracting means is contracted about said dog leg region to produce interference with said dog's paw and thereby prevent said dog leg region from sliding into contact with; said dog's paw; and a second cushion on said interior of said dog leg region generally opposed to said at least one cushion and non-overlapping therewith when said contracting means is contracted about said dog leg region.

2. The dog boot of claim 1, further comprising at least one slit in said generally tubular body extending from said open end towards said closed end, said generally tubular body overlapping upon itself at said slit and terminating prior to overlapping with said at least one cushion when said open end is operatively contracted.

3. The dog boot of claim 1, wherein said contracting means further comprises at least one releasable strap.

4. The dog boot of claim 2, wherein said slit generally narrows with decreasing distance from said closed end when fully expanded.

5. The dog boot of claim 1, wherein said contracting means defines a contracted circumference, and said at least one cushion is within said contracted circumference.

6. The dog boot of claim 5, further comprising at least one slit in said generally tubular body extending from said open end towards said closed end, said generally tubular body overlapping upon itself at said slit and terminating prior to overlapping with said at least one cushion when said open end is operatively contracted.

7. The dog boot of claim 2, wherein said at least one slit further comprises two opposed slits and said at least one cushion and said second cushion are interposed between said two opposed slits within a circumference defined by said contracting means, while only partially circumscribing said circumference.

8. The dog boot of claim 7, wherein said two opposed slits generally narrow with decreasing distance from said closed end when fully opened.

9. A dog boot, suitable for insertion and removal of a dog's leg and paw and providing an operatively protective covering about said dog paw, comprising:
    a generally tubular body member having a closed end and an open end and a ground engaging surface defining a dog paw region operative to surround said dog's paw and a dog leg region operative to surround said dog's leg;
    a means for contracting said dog leg region;
    at least one cushion on an interior of said dog leg region and immediately adjacent to said dog paw region ground engaging surface, said at least one cushion operative when said contracting means is contracted about said dog leg region to engage with said dog's paw and thereby prevent said dog leg region from sliding into contact with said dog's paw;
    an insertion edge terminating said at least one cushion adjacent said open end, said insertion edge most adjacent to said generally tubular body also most adjacent to said open end, said insertion edge sloped away from said open end such that as distance between a point on said insertion edge and said generally tubular body increases, distance between said point on said insertion edge and said open end also generally increases, thereby facilitating an insertion of said dog's paw into said paw region; and
    a second cushion on said interior of said dog leg region generally opposed to said at least one cushion and non-overlapping therewith when said contracting means is contracted about said dog leg region.

10. The dog boot of claim 9, further comprising a paw edge terminating said at least one cushion adjacent said dog paw region ground engaging surface, said paw edge defining a surface generally normal to said tubular body, thereby facilitating engagement with said dog's paw subsequent to said insertion.

11. A dog boot, suitable for insertion and removal of a dog's leg and paw and operatively providing protective covering about said dog paw, comprising:
    an operatively protective covering having a closed end and an open end and defining a dog paw region operative to surround said dog's paw, and defining a dog leg region operative to surround said dog's leg, said dog paw region located adjacent to said closed end and having a ground engaging surface, said dog leg region located adjacent to said open end;
    a means for contracting said dog leg region;
    at least one interference-producing cushion on an interior of said dog leg region protruding interiorly from said operatively protective covering above and immediately adjacent to said dog paw region ground engaging surface operative to produce interference with said dog's paw and thereby resist said dog leg region sliding into contact with said dog's paw; and
    a second cushion on said interior of said dog leg region generally opposed to said at least one interference-producing cushion and non-overlapping therewith when said contracting means is contracted about said dog leg region.

12. The dog boot of claim 11, wherein said at least one interference-producing cushion further comprises a termination distal to said open end, said at least one interference-producing cushion located entirely within said dog leg region.

13. The dog boot of claim 11, wherein said at least one interference-producing cushion further comprises a tapered edge most nearly adjacent to said open end which slopes simultaneously away from said open end and away from said operatively protective covering, thereby facilitating insertion of a dog's paw into said dog boot.

14. The dog boot of claim 11, wherein said at least one interference-producing cushion further comprises a foam pad.

15. The dog boot of claim 11, wherein said at least one interference-producing cushion further comprises elastic material.

* * * * *